United States Patent Office 2,971,010
Patented Feb. 7, 1961

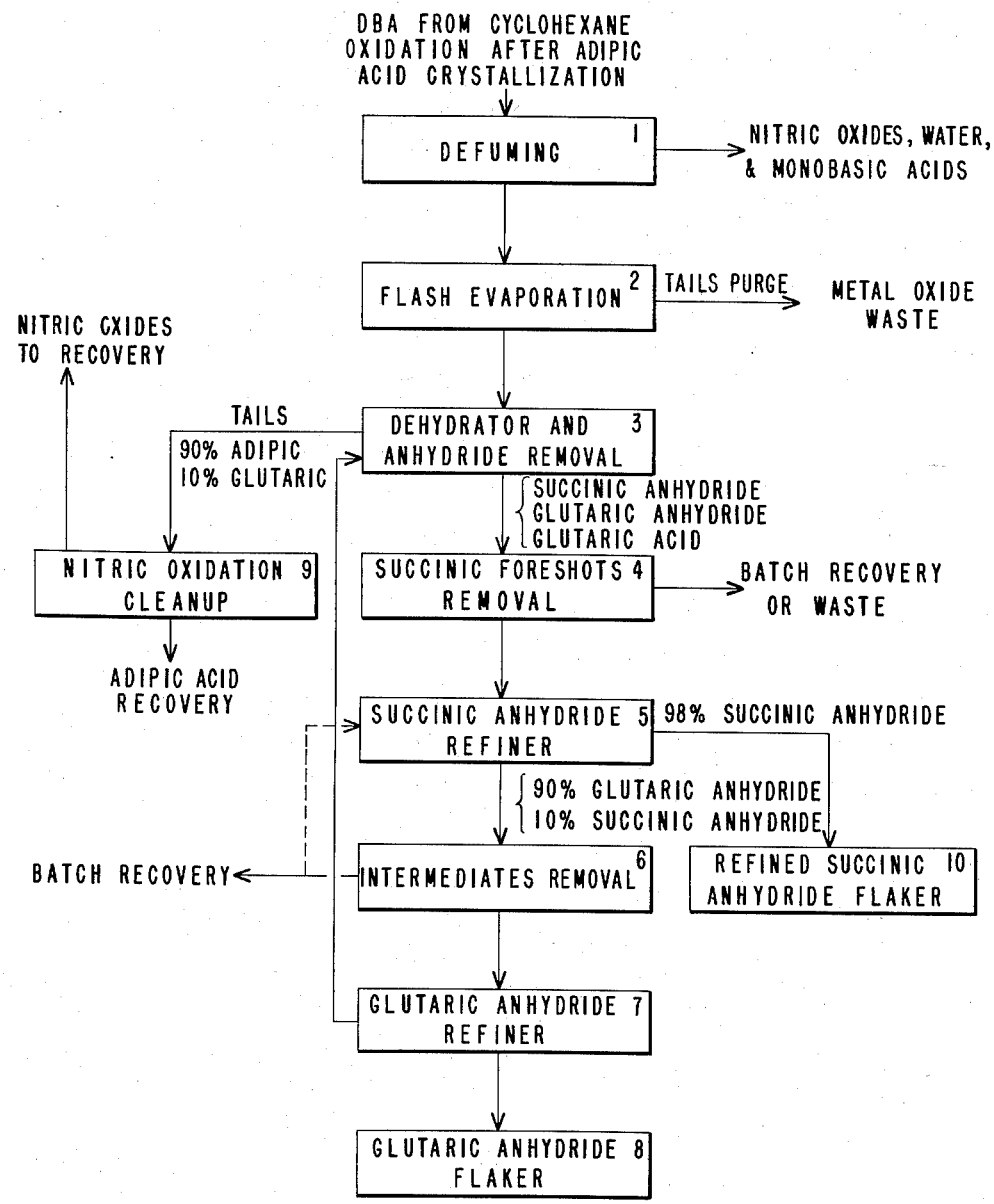

2,971,010
PRODUCTION OF DICARBOXYLIC ACID ANHYDRIDES

Ralph Fredrick Gilby, Jr., Charleston W. Va., Charles Edward Hoberg, Orange, Tex., and Murray Kenneth Phibbs, Kingston, Ontario, Canada; said Gilby and said Hoberg assignors to E. I. du Pont de Nemours and Company, Wilmington, Del., a corporation of Delaware, and said Phibbs assignor to Du Pont Company of Canada (1956) Limited, Montreal, Quebec, Canada, a corporation of Canada Filed June 26, 1958, Ser. No. 744,839
4 Claims. (Cl. 260—345.9)

This invention relates to a process for the production of dicarboxylic acid anhydrides and more particularly relates to the preparation and separation of individual aliphatic dibasic carboxylic acid anhydrides from mixtures comprising dibasic carboxylic acids.

Production of aliphatic dicarboxylic acids by the oxidation of cycloparaffins is of considerable commercial importance because of the widespread use of such acids in the manufacture of synthetic resins and the ready availability of the cycloparaffins from various sources. Direct oxidation of cycloparaffins, however, is known to give a variety of products from which separation of the derived acids, in a reasonable state of purity, is difficult and yields of any one acid are low. The high cost of these acids has, to a considerable extent, been attributable not so much to a failure in conversion of the cycloparaffin to the desired acid but to a failure in recovering the acid from the complex reaction mixture.

In U.S. Patents 2,439,513 and 2,557,282 of C. H. Hamblet and A. McAlevy, patented April 13, 1948, and June 19, 1951, respectively, cycloparaffins, such as cyclohexane, are oxidized in two steps to a mixture of aliphatic mono- and dibasic acids. In the first step of this oxidation process, the cycloparaffins are oxidized with air in the presence of a suitable air oxidation catalyst, and the whole reaction mixture which contains cyclohexanone, cyclohexanol and other oxidation products, is subjected to nitric acid oxidation in the second step whereby the cyclic ketones and cyclic alcohols of the air oxidation step are oxidized to aliphatic dibasic carboxylic acids. Due to the severe conditions of this dual oxidation reaction, monobasic acids and other byproducts are produced along with the more desirable dibasic acids. Reaction mixtures of monobasic and dibasic acids, from the aforesaid air-nitric acid oxidation process and like processes, are treated in various ways for the recovery of their acid content. In the "Adipic Acid Recovery Process" of C. H. Hamblet and R. E. Gee, U.S. 2,713,067, issued July 12, 1955, adipic acid is recovered from such a reaction mixture by crystallization. Other methods have been proposed and used but after such recovery processes, there still remains in the mother liquor from the crystallization or in the residue from other known recovery processes, unrecovered and heretofore unrecoverable acids. The invention relates to a process for recovery from such mother liquors, residues and other sources containing mixtures of carboxylic acids, these valuable acids either in the form of the acids or of their anhydrides.

An object of the present invention is to provide a process for the preparation and separation of aliphatic dibasic carboxylic acids anhydrides from mixtures of dibasic acids. Another object is to provide a process for the dehydration of an aliphatic dibasic carboxylic acid in a mixture comprising such acids and the separation from that mixture of the anhydride produced. Yet another object is to provide a simultaneous dehydration and distillation process for the separation of aliphatic dibasic carboxylic acids and anhydrides from a mixture thereof. Still another object is to provide an economical process for the recovery of aliphatic dibasic carboxylic acids from the residue remaining after crystallization and partial recovery of adipic acid from the product obtained by the air and nitric acid oxidation of cycloparaffins. Other objects and advantages of the invention will hereinafter appear.

In a broad embodiment, the invention relates to a process for the separation of a mixture of dibasic carboxylic acids from mixtures comprising such acids, monobasic carboxylic acids, nitric acid, and metallic salts, and for the substantially 100% conversion of the lower molecular weight dicarboxylic acids in the mixture of dibasic acids to anhydrides; this is accomplished by the dehydration, under certain controlled conditions of temperature and pressure, of the substantially anhydrous mixture of dibasic acids containing adipic acid whereby the lower dibasic acids of the mixture are dehydrated to their corresponding anhydrides, the reaction being driven to completion by removing by distillation the anhydrides and water as they are formed; the anhydrides are immediately separated from the water of dehydration, and refined by fractional distillation to obtain the recovery, in high yield, of the separated and purified dicarboxylic acid anhydrides; the adipic acid is recovered from the residue free from contamination with other dibasic acids.

In a more specific embodiment, the invention relates to the treatment of a mixture of dicarboxylic acids produced in accord with the processes of the Hamblet and McAlevy patents, ibid, and like processes. The product remaining after crystallization of the air and nitric acid oxidized cycloparaffin, by said patentees' and like processes, is a crude mixture comprising aliphatic dibasic carboxylic acids from which all of these acids cannot be recovered economically by further crystallization. The crude product and equivalent products are the raw materials which are treated in accord with the specific embodiment of this invention. Such crude reaction mixtures contain unrecovered dibasic acids (DBA), such as succinic, glutaric and adipic acids, as well as monobasic acids (MBA), metallic compounds and other byproducts. The mixture of DBA and MBA together with other oxidation products, such as those obtained by the air and nitric acid oxidation, is freed of monobasic carboxylic acids and nitric oxides by heating ("fume-off") either before or after removal of the metal ions, in accord with a specific embodiment of the invention. The liquor may be subjected to a process for the removal of any metal ions present, such as copper, vanadium, and the like, either by evaporation or by treatment with a cation exchange resin or other means of removing metal ions. However, the process can be operated without removal of the metal until after separation of glutaric and succinic anhydrides; the metal may then be removed from the residue before crystallization of adipic acid. When the separation of metals is effected by the evaporation process, nitric acid "fume-off" precedes the separation step whereas, when the ion-exchange process is employed to remove metal ions before dehydration, the nitric ions can be removed by ion exchange or by a "fume-off" step following the metal removal. The primary objectives of nitric "fume-off" are to distill off free nitric acid and to decompose nitrate salts and remove the resulting nitric oxides. The removal of nitric acid and nitrates is not mandatory for operation of the process, but preferably is carried out in order to reduce anhydride yield loss by degradation, to reduce corrosion and to improve process safety. Water and most of the monobasic acids in the feed stream are also removed in this step. For economic reasons this equipment should be operated preferentially at atmospheric pressure but vacuum operation is possible. Temperatures in the range of 150–180° C. are most favorable to decompose nitrate salts; however, decomposition occurs at temperatures as low as 120° C. under vacuum. Thereafter, in a preferred embodiment, the resulting mixture is more strongly heated under reduced pressure to flash evaporate essentially all volatiles away from the metal compounds. This step separates the metals from the organics. While this may be done to improve operation of the balance of the process, it is not essential since removal of the metals, by ion exhcange, or by evaporation, from the adipic acid residue is possible before recovery of good quality adipic acid by crystallization.

The evaporation is done under vacuum to keep the temperature practical and to avoid degradation. It is preferred to operate at 100 mm. Hg absolute and at about 260° C. However, operation at lower and higher pressures and temperatures is possible. With proper equipment 90–95% of the feed may be evaporated. In this evaporation as much as 70% of the succinic acid is dehydrated to the anhydride. This similar reaction for glutaric acid is much slower and less favorable. The evaporation step can be used on "defumed" feed that has had nitric acid and metals removed by ion exchange.

In the next step, which is the essential and critical portion of the process, the dibasic acids are dehydrated continuously by heating in a distillation unit while anhydrides of glutaric and succinic acids plus water of dehydration are distilled overhead together, or, alternatively, the distillation unit may be heated stepwise, succinic anhydride and water of dehydration being distilled overhead, followed by distillation, in the same manner but at higher temperature, of glutaric anhydride and water of dehydration, these DBA anhydrides being thereby separated from the adipic acid, which is withdrawn as a residue from the base of the distillation unit. Vapors of the anhydrides are condensed in a partial condenser while the water of dehydration passes through the partial condenser and is thereby separated from the DBA anhydrides.

The adipic acid concentrates in the base of the dibasic dehydration column along with a small quantity (5–10%) of unconverted glutaric acid and degradation tars. The adipic acid can be recovered from these tails by diluting with water, filtering the dissolved adipic solution to remove precipitated tars and then crystallizing the adipic acid. Alternatively, a purer adipic acid can be obtained if the water solution, after filtering to remove tars, is heated to 50–100° C. with nitric acid to destroy oxidizable byproducts before crystallization of the adipic acid. Where the metals have not previously been removed, they can be removed by ion exchange before oxidation and crystallization of the recovered adipic acid.

The mixture of glutaric and succinic anhydrides, which may contain a small amount of unconverted glutaric acid and of carried-over adipic acid, can be separated and refined by either of the process modifications described in the examples below. Alternatively, the mixed anhydrides can be separated in a distillation unit consisting essentially of a fractionation column where the mixed anhydrides are fed into the middle of the column in which the succinic anhydride is removed as a liquid, after partial condensation, at a point above the inlet feed-point, a foreshots fraction being taken overhead; the glutaric anhydride is removed as a vapor at a take-off point below the inlet feed-point, and any unconverted glutaric and adipic acids are recovered for recycle to the dehydrator from the base of this fractionation column.

The course of the reaction may be more readily understood by reference to the drawing, a single figure, which illustrates, by a diagrammatic flow-sheet, an example of one preferred embodiment of the invention in which a continuous process is carried out.

EXAMPLE 1

A mixture of dibasic and monobasic acids, constituting the mother liquor remaining after the crystallizing of adipic acid from a mixture of MBA and DBA obtained from the air and nitric acid oxidation of cyclohexane, and having a composition similar to that shown in the second example, is fed from a hold-up tank to a defumer 1 where nitric oxides, water and monobasic acids are taken overhead by heating the mixture to 165°–180° C. The essentially water- and nitrate-free mixture containing DBA is passed to an evaporator 2 where it is freed from metals by a flash evaporation in which the metals are removed in the tails, and thence to a dehydrator 3 wherein the conversion of succinic and glutaric acids to the anhydrides is accomplished by distillation of anhydrides and water of dehydration overhead, this removal of both reaction products serving to drive the dehydration reaction to completion. Adipic acid is recovered from the tails of this dehydrator by first subjecting the tails to dilution with water, filtration to remove degradation tars, and to oxidation with nitric acid 9 followed by crystallization of the adipic acid. The distillate from the dehydrator contains glutaric and succinic anhydrides and some glutaric acid and low boiling decomposition products. This distillate is passed to another fractionating column 4 where the low-boiling organics are separated overhead and sent to waste storage. The mixture of succinic and glutaric anhydrides is passed to a succinic anhydride refiner 5 where succinic anhydride is separated overhead and sent to a flaker 10. The tails are sent to an intermediates removal column 6 where intermediate boiling impurities and residual succinic anhydride left in the bottoms from the succinic anhydride refiner are removed, and thence to a refining column 7 where glutaric anhydride is distilled overhead. Tails from this column are returned to the dehydrator or evaporator 2. The glutaric anhydride is sent to a flaker 8.

The DBA obtained from the aforesaid mother liquors or like compositions contains such acids as succinic, glutaric and adipic acids. It has been found, in accord with the invention, that upon heating such substantially anhydrous dibasic acids and distilling the resultant anhydrides plus water overhead to drive the reaction, the acids are continuously dehydrated in the dehydrator 3 and the DBA anhydrides are distilled up the fractionation column and immediately separated from water of dehydration in the partial condenser which permits the water to pass overhead as vapor. In batch distillation the distillation is preceded by a vigorous evolution of water from the dehydration reaction, which is rapid initially and continues to a lesser extent throughout the course of the distillation. As the distillation proceeds, the dehydration reaction is, in effect, driven to completion by virtue of removing the reaction products by vacuum distillation.

Conditions for the operation of this dehydrator still 3 must be maintained within a critical range, as indicated by the data in Table I. One preferred combination of conditions used on one particular example of this process is also shown:

Table I

| | Range | Particular Example |
|---|---|---|
| Head Pressure, mm. Hg, abs | 10–400 | 200 |
| Head Temp., ° C | 140–250 | 228 |
| Base Temp., ° C | 190–280 | 260 |

Minimum temperatures and contact times are preferred in order to minimize degradation and contamination. Likewise the period of contact of liquid anhydride and water vapor must be kept as short as possible in order to avoid reversion of the anhydrides to the acids. After the separation of the succinic and glutaric anhydrides from the dehydrator 3, the residue contains anhydrous adipic acid together with a small proportion of glutaric acid. This molten tails residue is diluted with water, filtered and charged to an oxidizer 9 for clean-up and then can be treated for recovery of adipic acid by crystallization or other means.

Another embodiment of the process of the invention is carried out as described in the second example below in which parts are by weight unless otherwise indicated. In this embodiment of the process, the same column is used to dehydrate, and then to fractionate the resulting anhydrides.

EXAMPLE 2

A mixture of acids obtained from the process such as that described in the Hamblet and McAlevy patents, ibid, and after crystallization of a part of the adipic acid present, was analyzed and found to contain, in addition to monobasic acids and other byproducts:

| | Percent by weight |
|---|---|
| Adipic acid | 12 |
| Succinic acid | 20 |
| Glutaric acid | 46 |
| Water | 16 |
| Nitric acid | 4 |
| Cupric ntirate | 2 |

The freezing point range for this mixture was usually 95–105° C., the specific gravity at 25° C. being 1.2.

The aforesaid composition was heated to about 100° C. to dissolve completely the dibasic acids present. This solution was transferred to a diluting tank provided with an agitator and heat exchange coil. In this tank the composition was diluted with water, at a temperature of 40–50° C., to about a 35% total dibasic acid content.

The diluted mixture contained copper and nitric acid and salts. The copper was removed by cation exchange over a "Permutit Q" resin. Any suitable cation exchange resin may be used for the removal of the copper ions, and the process such as that described in the copending application of D. E. Welton, U.S. Serial Number 625,028, filed November 29, 1956, is a preferred process for removing those ions.

In order to facilitate distillation, the feed should likewise be treated for the removal of nitric acid, nitrate salts, monobasic carboxylic acids and water. This was done by subjecting the substantially copper-free mixture to evaporation at 100–200 mm. Hg absolute pressure and 120–140° C. whereby the major portion of the water was removed, and then by heating more strongly to 165–175° C. at atmospheric pressure whereby the nitric acid was removed by a controlled "fume-off" along with the traces of free water. After this treatment, the material was essentially dry and contained essentially no copper ion, nitrate ion, nitro groups or cyano groups.

The thus-treated mixture of acids was then subjected to simultaneous dehydration-distillation in a packed column equivalent to 10–20 theoretical plates. The following distillation conditions were explored and temperatures observed as shown in Table II:

Table II

| | Succinic Anhydride Distillation | | | Glutaric Anhydride Distillation |
|---|---|---|---|---|
| | A | B | C | |
| Head Press., mm. Hg abs. | 15–20 | 50–55 | 90–100 | 15–20 |
| Head Temp., ° C. | 139–145 | 165–172 | 178–190 | 159–165 |
| Pot Temp., ° C. | 205–225 | 205–235 | 210–235 | 230–245 |
| Reflux Ratio | 6:1 | 6:1 | 6:1 | 3:1 |

The anhydrous mixture of acids was charged to the still kettle. Column pressure was adjusted and heat applied to the kettle as shown in Table II, and at the same time, heat was applied to the overhead vapor lines, to the liquid reflux and make-up lines and to the partial condenser. These lines were maintained above about 120° C. during the succinic anhydride cut to prevent freezing in the lines.

During the initial part of the distillation operation, water vapor was rapidly evolved from the system along with residual monobasic acids. Since both water and the monobasic acids are well above their boiling points, under the conditions of distillation, they were thus removed from the system as foreshots through a partial condenser and condensed in a total condenser.

When the column reached equilibrium, a reflux ratio was adjusted to about 6:1 and the succinic anhydride distillation begun. When the temperature began to rise above about 145° C., 172° C. or 190° C., corresponding to the pressure level as specified in Table II under Succinic Anhydride Distillation conditions, following the succinic anhydride cut, the make was diverted into an intermediate receiver, and that product collected and returned to a hold-up tank for reprocessing.

The glutaric anhydride cut was next distilled at a head temperature above 155° C. and with a reflux ratio adjusted to about 3:1. At the end of this cut, the residue in the still kettle was essentially adipic acid. Water was added to the kettle and the adipic acid solution drained therefrom and sent to storage for recovery.

In these distillations, the yield of succinic anhydride and glutaric anhydride was approximately 98% of theoretical. The remaining percentage, moreover, was deemed to be assignable to analytical errors and to carbon formation.

While the second example illustrates an embodiment of the invention in which the process is conducted batchwise, the process can likewise be carried out in a continuous manner as in the first example, in which a low-boiler stripper (such as a rectifying column) is used with three distillation columns—one for the separation of the succinic anhydride, another for removal of intermediates and the other for the separation of the glutaric anhydride. The preheated mixture of substantially anhydrous DBA is continuously introduced into the low-boiler stripper maintained at a temperature between 150 and 200° C. and a pressure below 150 mm. Hg. The low-boilers are distilled overhead from this column, at a reflux ratio of about 20 to 1. The tails from this stripping operation at a temperature between 190 and 225° C. are introduced into the succinic anhydride distilling and fractionating column; the succinic anhydride is distilled overhead at 30 mm. Hg and at a reflux ratio of 5/1 and the tails from this column at 215° C. to 225° C. are fed to the intermediate removal column where intermediate boiling impurities and residual succinic anhydride are distilled at about 50 mm. and 180° C. and a reflux ratio of 6 to 1. The tails from this column at 200–220° C. are introduced into the glutaric anhydride distilling and fractionating column. In the latter column, the glutaric anhydride is distilled overhead at 25 mm., 170° C., and a reflux ratio of 2 to 1. The tails discharged from the column contain glutaric acid and glutaric anhydride and are recycled to the dehydrator or evaporator. Whereas in this example refining is done continuously in four stills, two stills (or even one) can be used drawing off the refined anhydrides as sidestreams as described hereinabove.

The process of the invention is effective for the recovery of adipic acid from mixtures with succinic and glutaric acids; for the preparation of succinic anhydride and glutaric anhydride and their separation from adipic acid in a mixture containing succinic, glutaric and adipic acids; for the recovery of the anhydrides of dibasic acids from mixtures of those acids which cannot be recovered by simple crystallization processes, or can be recovered by such processes only with difficulty; and for the preparation of succinic and/or glutaric anhydrides from their acids.

We claim:

1. In a simultaneous dehydration-distillation process for the preparation and separation of succinic and glutaric anhydrides, the steps which comprise heating a mixture of succinic, glutaric and adipic acids to a temperature between 190° and 280° C. and at a pressure between 10 and 400 mm. Hg absolute and successively distilling from the reaction mixture—first, succinic anhydride with water of dehydration; and second, glutaric anhydride with water of dehydration.

2. In a continuous, simultaneous dehydration-distillation process for the separation of succinic, glutaric and adipic acids from a mixture, containing these dicarboxylic acids together with monocarboxylic acids, nitric acid, and ionic metals, obtained by the catalytic air oxidation of cyclohexane followed by the nitric acid oxidation of the air-oxidized product and after partial removal of adipic acid by crystallization, the steps which comprise heating the concentrated mixture to 165–175° C. to distill off water and monocarboxylic acids and to "fume off" nitric acid, passing the resultant mix to a flash evaporator and heating to flash evaporate essentially all volatile materials away from metallic residues, heating the resulting mixture of acids and anhydrides in a dehydrator distillation unit to a temperature between 190° and 280° C. and a head pressure between 10 and 400 mm. Hg, absolute under which conditions, succinic anhydride and glutaric anhydride are formed, and driving the dehydration reaction to substantially 100% conversion by distillation of the anhydrides together with water of dehydration through a fractionation column with head temperature between 140° and 250° C.; immediately separating the anhydrides from water of dehydration by partial condensation, passing the mixture of succinic and glutaric anhydrides to fractionation columns to separate them by fractional distillation, and recovering adipic acid from the residue of the dehydration column.

3. In a continuous, simultaneous dehydration-distillation process for the separation of succinic, glutaric, and adipic acids from a mixture which contains these dicarboxylic acids together with monocarboxylic acids, nitric acid, and ionic metals, said mixture having been obtained by the catalytic air oxidation of cyclohexane followed by the nitric acid oxidation of the air-oxidized product and partial separation of the adipic acid by crystallization, the steps which comprise heating the concentrated mixture to 165–175° C. to distill off water and monocarboxylic acids and to "fume-off" nitric acid, heating the resulting mixture of acids in a dehydrator distillation unit to a temperature between 190° and 280° C. and a head pressure between 10 and 400 mm. Hg, absolute, under which conditions succinic anhydride and glutaric anhydride are formed, and driving the dehydration reaction to substantially 100% conversion by distillation of the anhydrides, together with water of dehydration, through the dehydrator column with a head temperature between 140° and 250° C.; immediately separating the anhydrides from water of dehydration by partial condensation, passing the mixture containing succinic and glutaric anhydrides to fractionation columns to separate the anhydrides by fractional distillation, and recovering adipic acid from the residue at the base of the aforesaid dehydrator distillation unit by diluting the residue with water, filtering to remove tars, treating the aqueous solution for removal of metal ions by use of a cation exchange resin, subjecting the resultant adipic acid solution to nitric acid oxidation, and crystallizing adipic acid.

4. In a continuous, simultaneous dehydration-distillation process for the separation of succinic, glutaric, and adipic acid, from a mixture which contains these dicarboxylic acids together with monocarboxylic acids, nitric acid, and ionic metals, said mixture having been obtained by the catalytic air-oxidation of cyclohexane followed by the nitric acid oxidation of the air-oxidized product and partial separation of the adipic acid by crystallization, the steps which comprise heating the concentrated mixture to 165–175° C. to distill off water and monocarboxylic acids and to "fume-off" nitric acid, heating the resulting mixture of acids in a dehydration distillation unit to a temperature between 190° and 280° C. and a head pressure between 10 and 400 mm. Hg, absolute, under which conditions succinic anhydride and glutaric anhydride are formed, and driving the dehydration reaction to substantially 100% conversion by distillation of the anhydrides, together with water of dehydration, through the dehydrator column with a head temperature between 140° and 250° C.; immediately separating the anhydrides from water of dehydration by partial condensation; passing the liquid mixture containing succinic and glutaric anhydrides, through a feed-point into the middle of a fractionation column where the succinic anhydride is recovered as a liquid, after partial condensation, at a point above the inlet feed-point while a foreshots fraction is taken overhead, and the glutaric anhydride is removed as a vapor at a take-off point below the aforesaid inlet feed-point, and any unconverted glutaric and adipic acids are removed from the base of this column and recycled to the aforesaid dehydrator; and recovering the adipic acid from the residue at the base of the aforesaid dehydrator column by flash evaporation of the volatile organic materials away from metals and tars and dilution of the distillate with water, subjecting the resultant adipic acid solution to nitric acid oxidation, and crystallizing the adipic acid.

No references cited.